United States Patent
Marsetti (10) Patent No.: US 7,650,983 B2
(45) Date of Patent: Jan. 26, 2010

(54) MEMBER FOR REMOVABLY CONNECTING AT LEAST ONE VERTICAL GUIDE AND SLIDE WALL ABOVE A CONVEYOR, THE VERTICAL GUIDE AND SLIDE WALL, AND GUIDE AND SLIDE MEANS FOR SAID WALL

(75) Inventor: Sergio Marsetti, Castelli Calepio (IT)

(73) Assignee: System Plast S.r.l., Telgate (Bergamo) (IT)

( * ) Notice: Subject to any disclaimer, the term of this patent is extended or adjusted under 35 U.S.C. 154(b) by 30 days.

(21) Appl. No.: 12/137,060

(22) Filed: Jun. 11, 2008

(65) Prior Publication Data

US 2009/0308711 A1 Dec. 17, 2009

(51) Int. Cl.
*B65G 47/26* (2006.01)
(52) U.S. Cl. .................................. 198/452; 198/453
(58) Field of Classification Search ............... 198/452, 198/453, 454, 455, 860.1; 193/35 R, 35 C
See application file for complete search history.

(56) References Cited

U.S. PATENT DOCUMENTS

| | | | | |
|---|---|---|---|---|
| 5,143,200 A | * | 9/1992 | Fuller | 198/453 |
| 6,079,544 A | * | 6/2000 | Donati et al. | 198/452 |
| 6,561,340 B2 | * | 5/2003 | Reatti | 198/454 |
| 6,598,729 B2 | * | 7/2003 | Marsetti et al. | 198/452 |
| 6,991,086 B2 | * | 1/2006 | Ledingham | 198/454 |
| 7,147,098 B2 | * | 12/2006 | Ledingham | 198/453 |

* cited by examiner

*Primary Examiner*—James R Bidwell
(74) *Attorney, Agent, or Firm*—Cozen O'Connor (57) ABSTRACT

A member for removably connecting at least one vertical guide and slide wall (1A, 101A) to a support structure (2, 102), in which said at least one lateral guide and slide wall is provided above at least one flat conveyor (3) for conveying products (4), said products coming into contact with a vertical flat slide surface (S) of said at least one guide and slide wall during their movement, said at least one guide and slide wall comprising a holding structure (5, 105) arranged to support said slide surface (S), said holding structure (5, 105) being provided with at least one flat portion (11, 111A, B) parallel to said slide surface (S), in which said member comprises: an elongate body (20, 35) presenting at least a part (21, 31) of reduced thickness (L3) compared with the remaining part of said body, first means (22A, B) for connecting said body (20, 35) and said holding structure (5, 105 together while maintaining said reduced thickness part (21, 31) and said flat portion (11, 111A, B) in mutual contact, and second means (28A) enabling said reduced thickness part to be connected to said support structure (2, 102).

32 Claims, 7 Drawing Sheets

MEMBER FOR REMOVABLY CONNECTING AT LEAST ONE VERTICAL GUIDE AND SLIDE WALL ABOVE A CONVEYOR, THE VERTICAL GUIDE AND SLIDE WALL, AND GUIDE AND SLIDE MEANS FOR SAID WALL

The present invention relates to a member for removably connecting at least one vertical guide and slide wall to a support structure, in which said at least one vertical guide and slide wall is provided above at least one flat conveyor for conveying products which come into contact with a slide surface of said at least one guide and slide wall during their movement, in accordance with the precharacterising part of the main claim.

In the present context, flat conveyors are conventional modular conveyors of chain or belt type, used for example for conveying bottles within bottling plants. As is known to the expert of the art, to guide the conveyed products, and in particular bottles, it is usual to provide along each side of and just above the conveyor, a vertical guide and slide wall which, to prevent damage to the conveyed products and facilitate their sliding, is generally provided, on that side face which comes into contact with said products, with a slide surface formed from a plurality of idle rollers. These lateral walls are generally fixed to a conventional fixed support structure of the conveyor, and more particularly to vertical support elements provided to the sides of or above said guide walls, themselves being connected for example to crosspieces of said structure.

Often, the flat conveyors comprise a plurality of mutually parallel coplanar conveyors forming a single continuously moving extended surface, such systems requiring not only lateral guide and slide walls but also "central" guide and slide walls provided between one conveyor and that immediately adjacent, they being generally formed from two lateral walls connected parallel to each other, one to the side of the other. There has been a long-felt requirement both to construct these "central" walls, formed by joining together two "lateral" walls, such that their thickness is as small as possible, so as to optimise the useful area of conveyor surface on which the conveyed products rest, and to provide members for connecting said central walls together and to the support structure, which ensure reliable and robust connection of said components together. Similar requirements are also felt with reference to the connection of the lateral walls to the respective support structures.

The known connection members do not satisfy either of the aforesaid requirements.

An object of the present invention is to provide a member for removably connecting at least one vertical lateral guide and slide wall to a support structure, of the aforedescribed type, which ensures that the guide and slide walls are always connected to the relative support structure in an optimal, reliable, robust and safe manner.

A further object is to provide an easily produced member by which the production times and costs are reduced.

A further object is to provide a member which can be easily and quickly connected to the lateral and/or central walls and to the relative support structure.

Another object of the invention is to provide a lateral or central wall of low production cost, of simple construction, and which can be easily curved without excessive force.

Another object of the invention is to provide slide and guide means for lateral or central walls which can be easily inserted into the relative housing seats and can be easily curved.

These and other objects which will be apparent to the expert of the art are attained by a member, by an element or wall for the guiding and sliding of the handled products, and by guide and slide means for the handled products, in accordance with the characterising part of the accompanying claims.

The present invention will be more apparent from the accompanying drawings, which are provided by way of non-limiting example and in which.

With reference to FIGS. 1-4, these show a first embodiment of a member for removably connecting a central guide and slide wall 1 to a support structure (partially represented in FIG. 4, but of conventional type to the expert of the art), in which at least one slide wall is provided above at least one flat conveyor 3 (partially represented in FIG. 4, but of conventional type to the expert of the art) for conveying products 4 which come into contact with said wall during their movement.

The central slide wall 1 is of the type formed by connecting together two identical "lateral" slide walls 1A, each comprising, as is conventional to the expert of the art, a holding structure 5 for a roller slide surface S (FIG. 4), in which said surface S is formed, as is conventional to the expert of the art, by a plurality of idle rollers 7 mounted on relative pins 8, and by connection elements 9 for said pins within suitably shaped seats 10 of said slide surface S.

Figure 1:
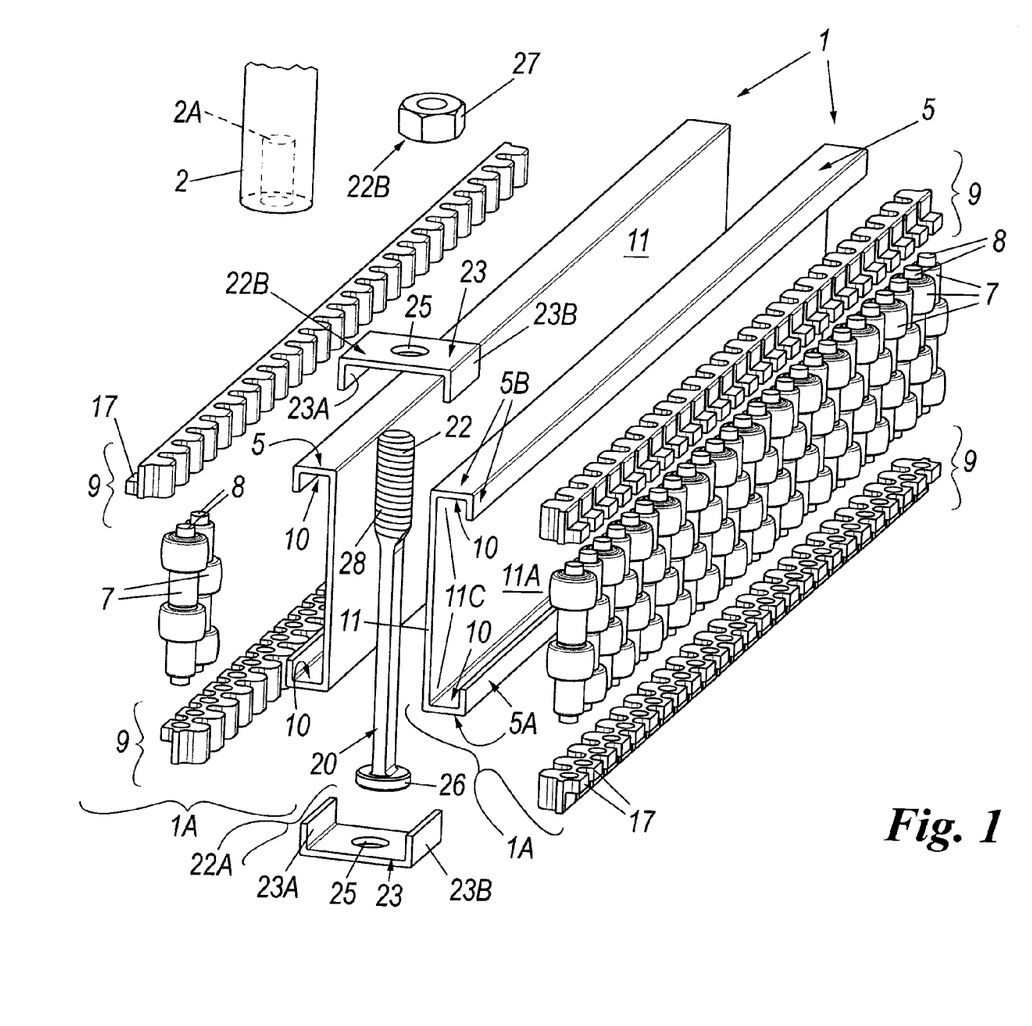
FIG. 1 is an exploded schematic perspective view of a member according to the invention shown partially disassembled, together with the components of a central guide and slide wall.
Figure 2:
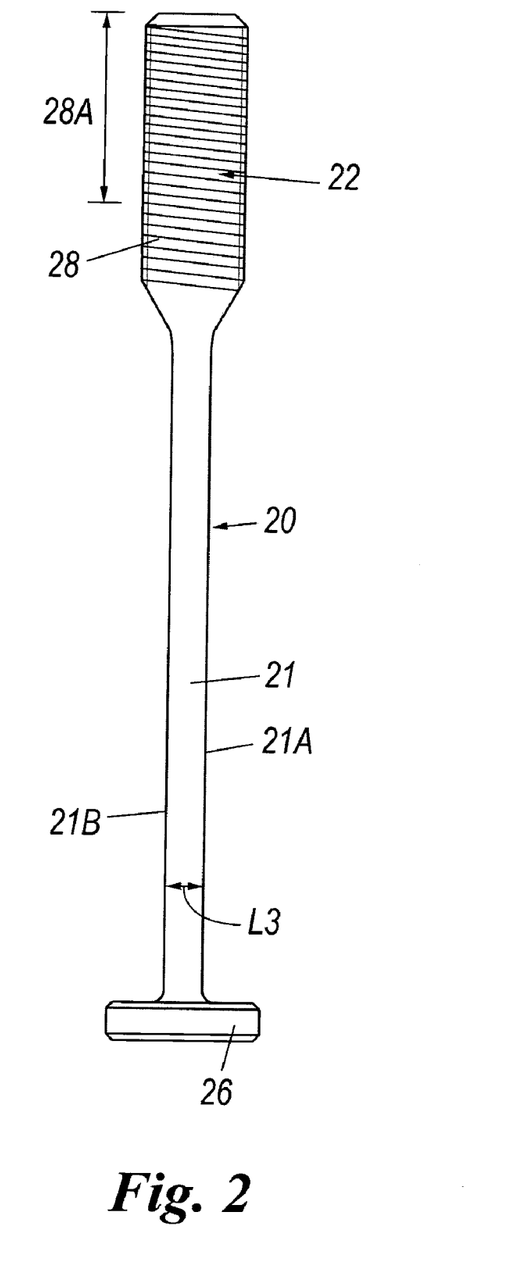
FIGS. 2 and 3 show enlarged partial schematic side views thereof respectively.
Figure 3:
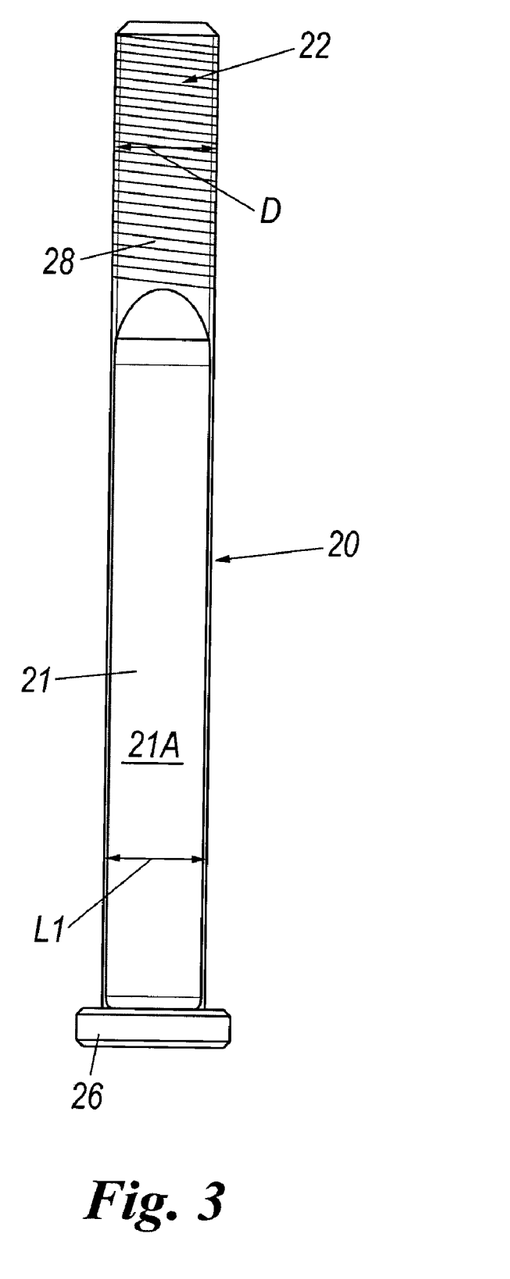

The connection member of the invention comprises: an elongate body 20 presenting a substantially plate-like part 21, the outer faces 21A, B of which are arranged to come into contact with and to adhere to the outer faces of the flat wall 11 of the holding structure 5 for the roller walls 1A when said member connects said two roller walls 1A together. At its ends the elongate body 20 also presents first means 22A, B enabling the plate-like part 21 to be connected to the slide walls 1A, and second means 22 enabling said plate-like part 21 to be connected to the conveyor support structure 2 (FIG. 1). The first means 22A, B for connecting the slide walls 1A to the member of the invention comprise a coupling bracket 23 with a central hole 5 and shaped such that its end parts 23A and B have the same shape and can adhere, by being coupled thereto, to the upper and lower edges 5A, 5B of the holding structure 5 for the slide wall 1A. In the embodiment of FIGS. 1-4 in which these edges 5A, B are L-shaped, the end parts 23A, B of the bracket 23 are also L-shaped.

The connection member of the invention comprises an upper bracket and a lower bracket, the lower bracket being retained in position by a widened base 26 of the body 20, while the upper bracket is retained by a nut 27 engaged by an upper threaded portion 28 of the body 20. That part 28A (FIG. 4) of the threaded portion 28 not engaged by the nut 27 is used to fix the connection member to the conveyor support structure 2 which for this purpose presents a suitably threaded and dimensioned hole 2A.

Figure 4:
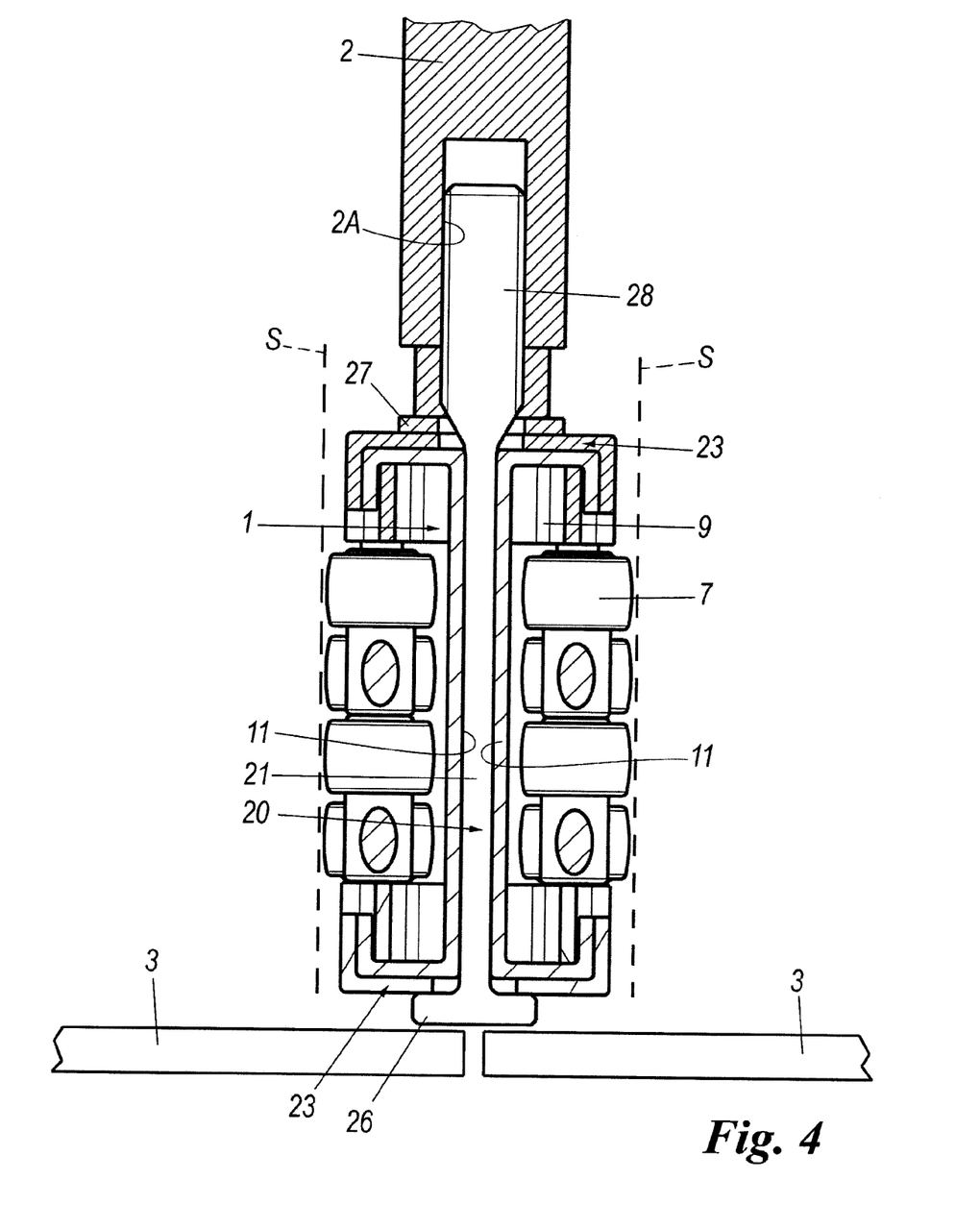
FIG. 4 shows a schematic cross-section therethrough when connected to a central wall and to an upper support structure (partially represented)

The body 20 is substantially formed from a pin with a head 26, a flat elongate body 21 and a threaded free end 28, in which the flat body has a width L1 (FIG. 3) equal to the diameter D of the threaded part, and thickness L3 (FIG. 3) less than 5 mm and preferably equal to 3 mm. The body 20 and the relative brackets 23 can be easily constructed at very low cost. As shown in FIG. 4, the connection member of the invention is able to ensure an extremely reliable connection for the two slide walls 1A without determinedly influencing the overall width M of the central wall.

Figure 8:
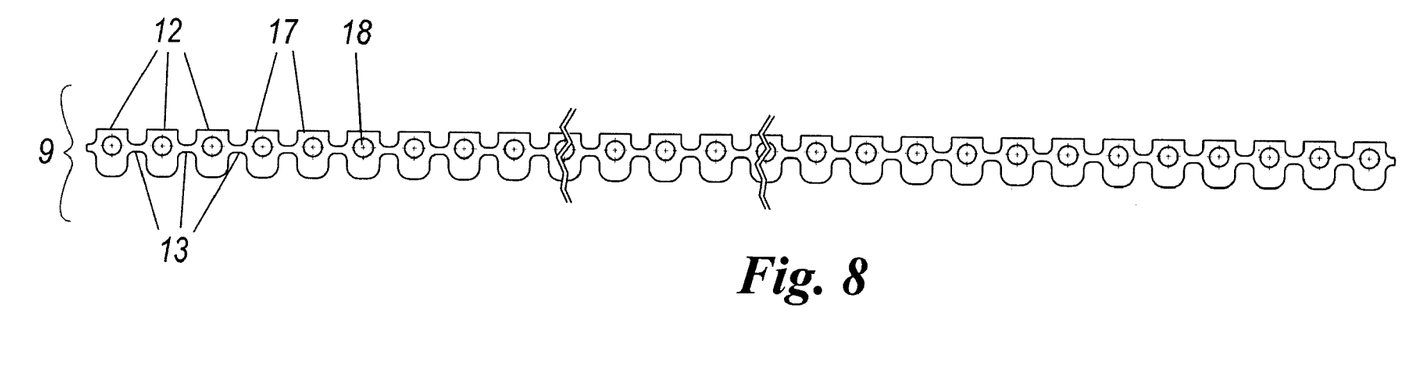
FIGS. 8 and 9 show a schematic view from above and an enlarged view of a component of the central wall.
Figure 9:
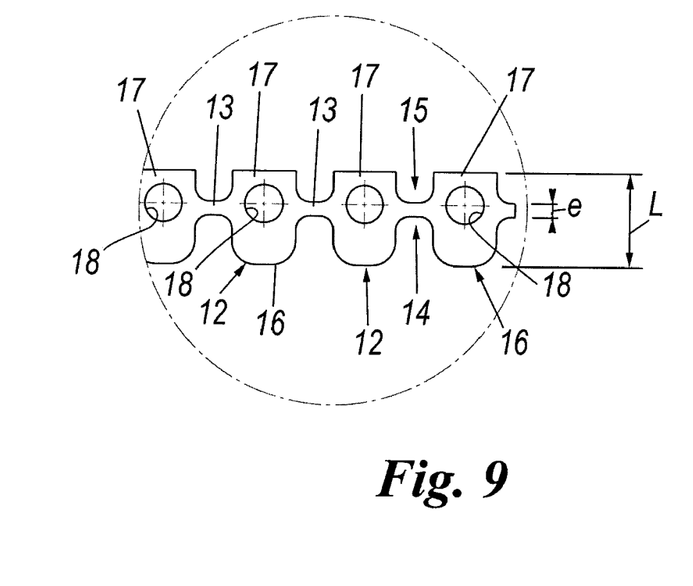
Figure 10:
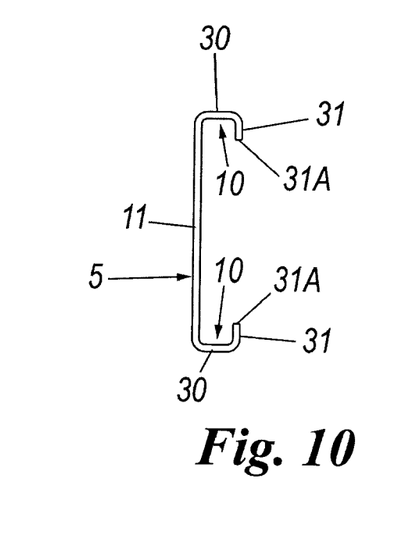
FIG. 10 shows a side view and a further component of the central wall.
Figure 11:
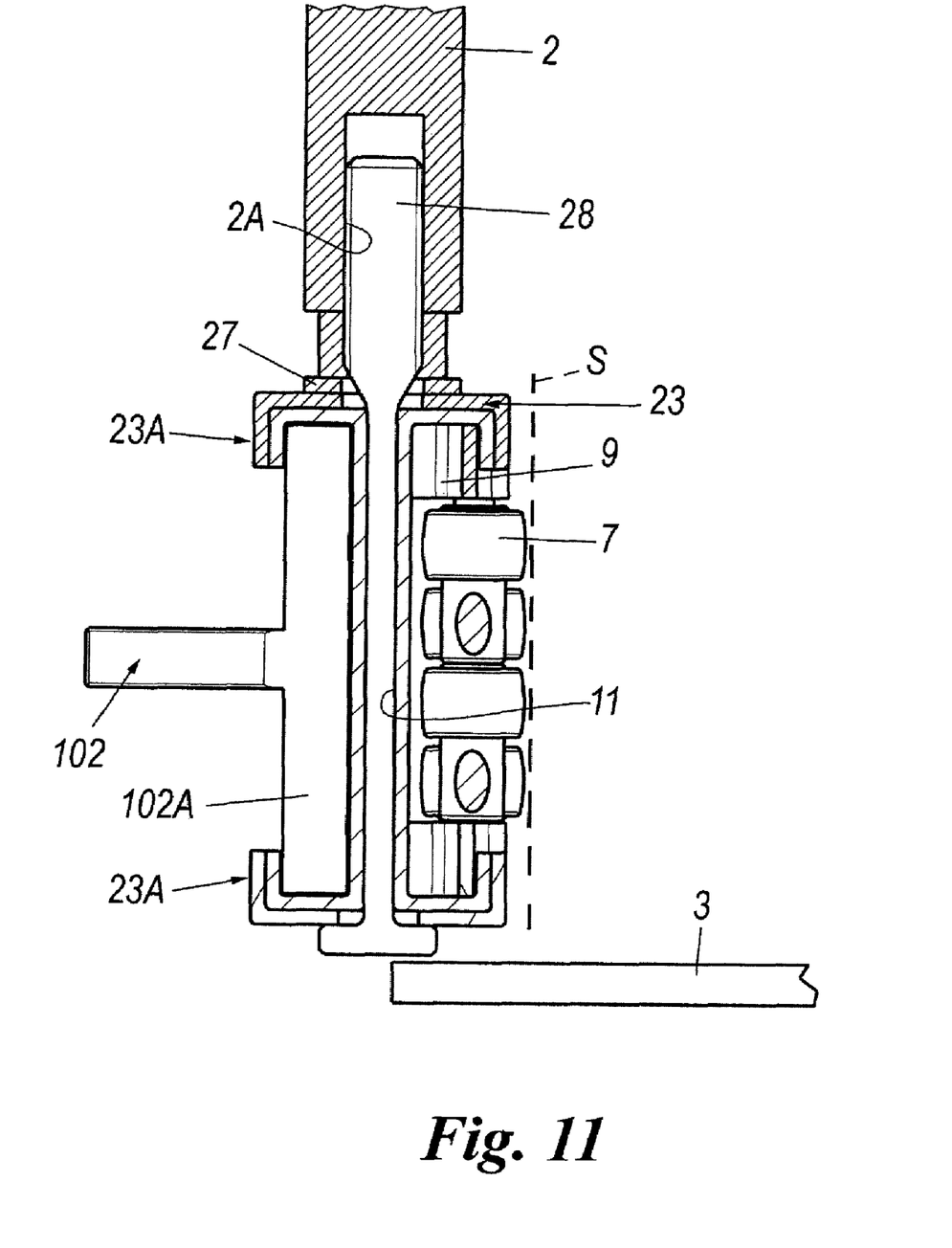
FIG. 11 is a cross-section showing a possible different use of a connection member of the invention.

In the lateral walls 1A shown in FIGS. 1-4 the holding structure 5 is advantageously of a rigid metal material, for example steel, the connection elements being of a moulded plastic material, for example acetal resin. The holding structure 5 (FIG. 10) is preferably made as a suitably shaped single piece, from the upper and lower edges of its vertical flat wall 11 there extending a first wall 30 perpendicular to the wall 11 and a wall 31 parallel to the wall 11, these forming, together with a portion of the wall 11, the C-shaped seat 10 for the connection elements 9 for the ends of the roller pins 8. The connection elements 9 (FIG. 8, 9) comprise a plurality of pieces 12 connected centrally together by arms 13 of width 1 considerably less than the width 1 of said pieces (about 5-7 times less), to hence define empty spaces or slots 14 and 15 between one part 12 and the adjacent part. Preferably the arms are not centered about the pieces 12 but are provided in a position such than when the connection elements are inserted into the holding structure 5, that slot 14 of greater dimensions faces the flat wall 11 of the structure 5. The presence of the slots 14 and 15 and their shape enable an assembled straight wall 1A to be curved to form curved slide walls, this being a usual operation to the expert of the art. The asymmetry of the slots 14, 15 and their shape enable the moulding process for the connection elements 9 to be simplified and balanced.

The pieces 12 comprise a rounded wall 16 at that portion facing the vertical flat wall 11, this portion being dimensioned such as to make contact with the inner face 11A of said flat wall 11 of the holding structure 5. The rounding facilitates insertion of the connection elements 9 into the relative C-shaped seats 10 of the holding structure 5. The pieces 12 also comprise a tooth 17 projecting from the piece 12 and abutting against the free edge 31A of the wall 31 (FIG. 10) bounding the seat 10 for said pieces. This projecting tooth also enables the hole 18, provided in the pieces 12 to house the end of the pins 8 on which the rollers 7 are mounted, to be displaced outwards as far as possible. Because of the presence of the tooth 17, and the fact that the hole 18 is displaced outwards, reduced-diameter rollers 7 can be used in order to limit the diameter of said rollers and the overall length of the wall 1A. The end of the pins 8 and/or the hole 18 for said end can be shaped such as to improve the connection between the pins and the pieces 12, for which purpose said ends can for example be conical or comprise an annular groove into which a projection provided in the hole 18 can be snap-inserted.

Figure 7A:
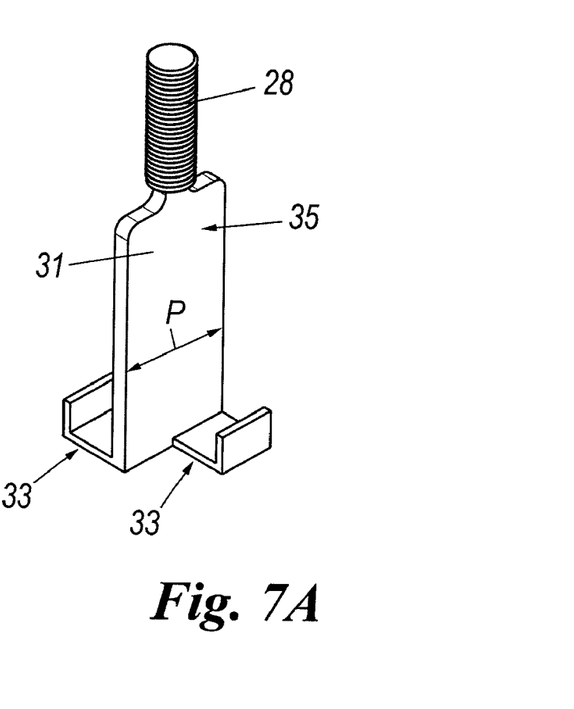
Figure 7B:
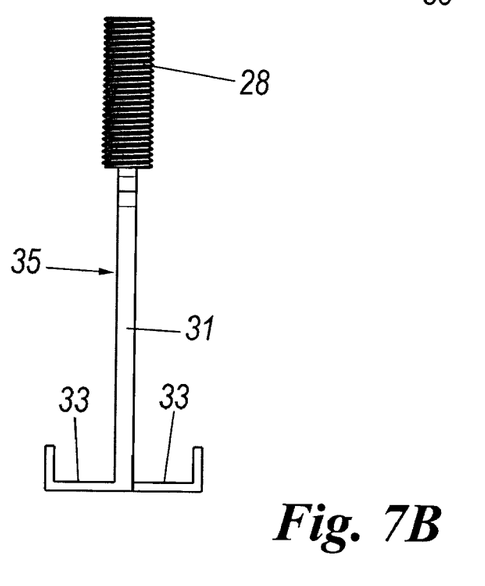

FIGS. 7A, B show a first variant of the aforedescribed portion 5 of the connection member, in this variant the portion 35 having its lower bracket 33 formed integral with the portion 35 itself, and a flat part 31 of greater width P.

Figure 5:
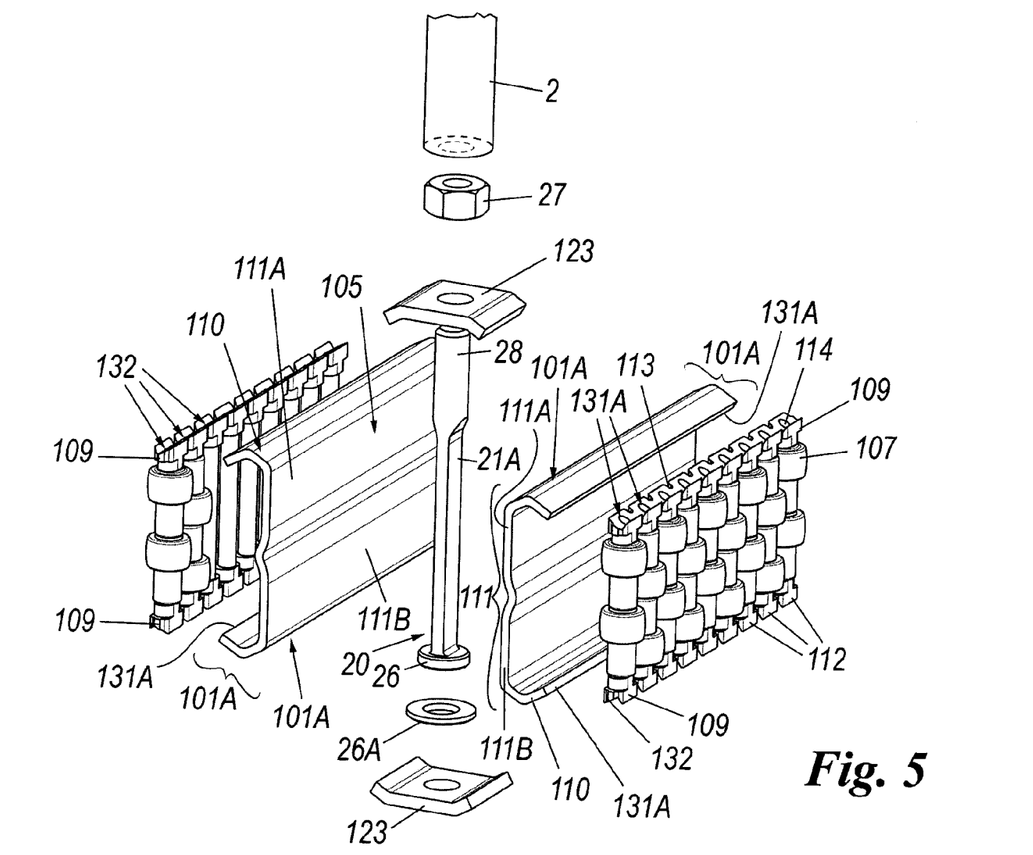
FIGS. 5 and 6 are views such as those of FIGS. 1 and 4, but of a first variant, FIGS. 7A, B show respectively a schematic perspective and side view of a second variant.
Figure 6:
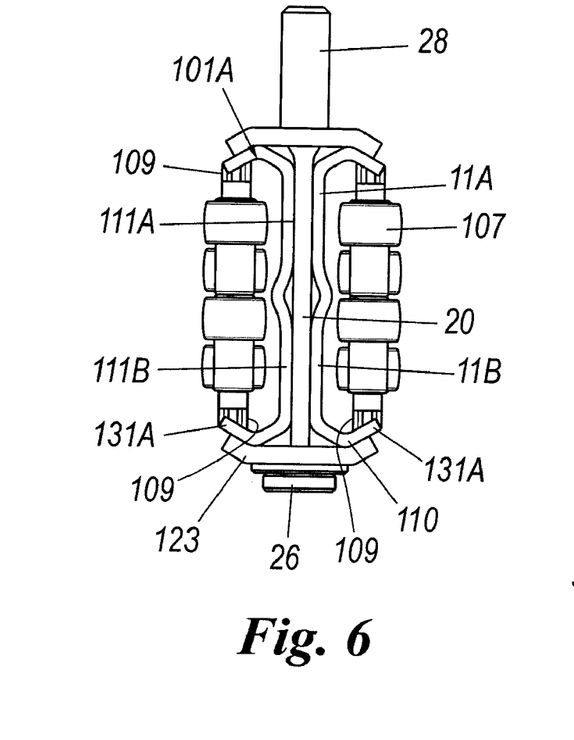

The aforedescribed lateral walls 1A could also be shaped differently. FIGS. 5 and 6 show a possible variant thereof and a suitably modified connection member. In this variant, the walls 101A have a holding structure 105 presenting a vertical wall 111 with two coplanar vertical flat portions 111A and B separated centrally by a bent portion. From the upper and lower edges of the vertical walls 111A and B there extend rounded portions 110, on the edges 131A of which there engage the connection elements 109 for the pins 108 of the rollers 107.

As in the previously described embodiment, the connection elements 109 present a plurality of pieces 112 separated from each other by slots 113, 114 enabling the elements 109 to curve. The pieces 112 present in their base wall a V-shaped seat 132 to slide on, and be retained by, the edges 131A of the rounded portions 110.

The connection member of this variant is substantially identical to that previously described, the only difference being a modified shape of the brackets 123 to adapt it to the outer shape of the projecting portions 110 of the holding structure 105 extending from the flat walls 11A, B to ensure that said brackets adhere perfectly to said projecting portions.

The lateral walls 1A described up to this point are of a particular type, not conventional to the expert of the art, however it should be noted that the connection member of the invention is able to connect together and to a conveyor support structure 2 all the usual conventional lateral walls comprising a one-piece or multi-piece holding structure, in which said structure has at least one flat portion, parallel to the slide surface S which can be either of the roller type or of the usual smooth or profiled wall type.

It should also be noted that the connection member of the invention can also be used to connect individual lateral walls to support structures 2 provided above the wall, of the type illustrated up to this point, or to lateral support structures 102. In this latter case the support structure 102 has a part 102A shaped and dimensioned such as to be able to be engaged by the free portion 23A of the brackets 23 or, vice versa, said brackets can be modified and shaped in a manner evident to the expert of the art such that their free part, which does not engage the slide wall, can engage said lateral structures.

Finally it should be noted that the aforedescribed embodiment is provided by way of example only, and that numerous variants are possible, all falling within the same inventive concept. It should also be noted that the aforedescribed lateral walls of new type could be connected to supports on the conveyor support structure which are different from those heretofore described and of conventional type to the expert of the art. Similar considerations also apply to the guide and slide means 7-9 and in particular to the connection pieces 12, 9, which could also be associated with walls of type different from the aforedescribed, but still conventional to the expert of the art.

The invention claimed is:

1. A member for removably connecting at least one vertical guide and slide wall (1A, 101A) to a support structure (2, 102), in which said at least one lateral guide and slide wall is provided above at least one flat conveyor (3) for conveying products (4), said products coming into contact with a vertical flat slide surface (S) of said at least one guide and slide wall during their movement, said at least one guide and slide wall comprising a holding structure (5, 105) arranged to support said slide surface (S), said holding structure (5, 105) being provided with at least one flat portion (11, 111A, B) parallel to said slide surface (S), characterised in that said member comprises:
a vertical elongate body (20, 35) presenting at least a part (21, 31) of reduced thickness (L3) compared with the remaining part of said body,
first means (22A, B) for connecting said body (20, 35) and said holding structure (5, 105) together while maintaining said reduced thickness part (21, 31) and said flat portion (11, 111A, B) in mutual contact, and second means (28A) enabling said reduced thickness part to be connected to said support structure (2, 102).

2. A member as claimed in claim 1, characterised in that the reduced thickness part (21, 35) is plate-like.

3. A member as claimed in claim 1, characterised in that the reduced thickness part (21, 35) has a thickness less than or equal to 6 mm.

4. A member as claimed in claim 1, characterised in that the elongate body has the shape of a pin and presents a threaded end portion (22), the reduced thickness part (21, 35) having a width (11) substantially equal to the diameter of said threaded part.

5. A member as claimed in claim 1, characterised in that the first connection member are shaped as a bracket (23), said bracket having a shape complementary to that of the outer surface of the portion (5A, B) of said holding structure (5) to act as a seat for at least partially housing the slide surface (S).

6. A member as claimed in claim 5, characterised by comprising two brackets (23), one to secure a lower portion (5A) of the holding structure and the other an upper portion (5B).

7. A member as claimed in claim 6, characterised in that the two brackets (23) have a through hole (25), the elongate body (20) presenting at its lower end an abutment element (26) for the lower bracket, and at its upper end a threaded portion (28) with which a tightening element (27) engages to urge the two brackets towards each other in order to secure the holding structure (5) for the wall provided between said brackets.

8. A member as claimed in claim 6, characterised in that the lower bracket (33) is integral with the elongate body (35).

9. A member as claimed in claim 1, characterised in that the second means (28A) enabling said reduced thickness part to the connected to said support structure (1, 102) comprises a threaded portion (22) provided at an upper end of the elongate body (20, 35).

10. A member as claimed in claim 1, characterised by connecting together two identical slide and guide walls (1A) and maintaining them mutually parallel and at the same height in order to form a central wall for conveyors.

11. A member as claimed in claim 5, characterised in that the complementary shape to that of the outer surface of the portion (5A, B) of said holding structure (5) acting as a seat for at least partially housing the slide surface (S) is an L or V or C shape.

12. A guide and slide element (1A, 101A) to be located, in particular by a connection member claimed in claim 1, above at least one flat conveyor (3) for conveying products (4), said products coming into contact with means (7-9) facilitating the sliding and guiding of said conveyed products, said means (7-9) defining a vertical flat slide and guide surface (S), said element comprising a holding structure (5, 105) presenting two spaced-apart opposing seats (5A, B) for supporting and at least partially housing said slide and guide means (7-9), said holding structure (5, 105) presenting a rear vertical wall (11, 111) parallel to the slide surface (S), said seats (5A, B) for the slide and guide means extending from the upper and lower edge of said wall,
characterised in that
said rear vertical wall (11, 111) is substantially flat and defines, at that element outer face opposing said slide and guide means (7-9), a substantially continuous plane without parts projecting perpendicular to said vertical wall and extending in the opposite direction to that in which the slide and guide means are provided, to hence minimize the total width of the slide and guide element and facilitate its curvature.

13. An element as claimed in claim 12, characterised in that the holding structure is formed in a single piece.

14. An element as claimed in claim 12, characterised in that the seats (5A, B) for the slide and guide means (7-9) are formed by bending an upper portion and a lower portion of the vertical wall (11, 111).

15. An element as claimed in claim 12, characterised in that a portion of the seats (5A, B) for the slide means (7-9) is formed by a part of that face of the rear vertical wall (11) facing said means.

16. An element as claimed in claim 14, characterised in that the seats (5A, B) for the slide and guide means (7-9) are formed by bending the upper portion and lower portion of the vertical wall (11, 111) into L or V-shapes.

17. An element as claimed in claim 12, characterised in that the seats (5A, B) for the slide and guide means (7-9) are formed: by a first wall (30) perpendicular to the rear vertical wall (11) and extending from the upper or lower edge of said vertical wall, by a second wall (31) parallel to said rear vertical wall and extending from the free edge of said first wall, and from a portion (11C) of said rear vertical wall provided at the lower or upper edge of said rear vertical wall.

18. An element as claimed in claim 12, characterised in that the seats for the slide and guide means (7-9) are formed by a free edge (131A) of an upper and a lower arcuate wall (110) which extend from the upper and lower edges of the rear vertical wall (111).

19. An element as claimed in claim 12, characterised in that the slide and guide means comprise a plurality of idle rollers (7) supported by pins (8) connected to a plurality of connection pieces (12) shaped to be able to be housed in the seats (5A, B) provided for said slide and guide means.

20. An element as claimed in claim 19, characterised in that the connection pieces of each roller are connected together to form an elongate body (9) comprising, between one and the next connection piece, slots (14, 15) which facilitate the curving of said elongate body.

21. An element as claimed in claim 20, characterised in that the slots (15, 14) have different dimensions from each other, the slot (14) of greater dimensions being that in which the aperture faces the rear vertical wall (11) of the holding structure (5).

22. An element as claimed in claim 20, characterised in that the connection pieces (12) comprise a rounded wall (16) in that portion thereof facing the rear vertical flat wall (11), said portion being dimensioned such as to come into contact with the inner face (11A) of said rear vertical wall (11) when said pieces are inserted into the relative seat (5A, B).

23. An element as claimed in claim 20, characterised in that the connection pieces (12) comprise a tooth (17) projecting from the piece (12) and arranged to abut against a free edge (31A) of the seat for said pieces.

24. An element as claimed in claim 23, characterised in that the hole for housing the free ends of the pins (8) carrying the idle rollers (7) is at least partially provided in said projecting tooth (17).

25. An element as claimed in claim 19, characterised in that the connection pieces of each roller present in a base wall thereof a V-shaped seat (132) arranged to slide on and be retained by edges (131A) of arcuate walls (110) extending from the vertical rear wall.

26. A central guide and slide element (1A, 101A) to be located, in particular by a connection member claimed in claim 1, above at least one flat conveyor (3) for conveying products (4), said products coming into contact with means (7-9) facilitating the sliding and guiding of said conveyed products, said means (7-9) being provided on two opposing mutually parallel faces such as to define two vertical flat slide and guide surfaces (S), characterised by being formed using two lateral slide and guide elements claimed in one of claims from 12 to 25.

27. Means to facilitate the sliding and guiding of products conveyed by a flat conveyor (3), in particular means to be associated with a slide and guide element claimed in claim 12, said means being adapted to be associated with a holding structure (5) to be positioned above said conveyor (3), said means comprising: a plurality of idle rollers (7) supported by pins (8) connected to a plurality of connection pieces (12) shaped to be able to be housed in seats (5A, B) provided in said holding structure (5), characterised in that the connection pieces (12) of each roller are connected together to form an elongate body (9) comprising between one and another connection piece slots (14, 15) facilitating the curvature of said elongate body.

28. Means as claimed in claim 27, characterised in that the slots (15, 14) have different dimensions from each other, the slot (14) of greater dimensions being that in which the aperture faces a rear vertical wall (11) of the holding structure (5).

29. Means as claimed in claim 27, characterised in that the connection pieces (12) comprise a rounded wall (16) in that portion thereof facing a rear vertical flat wall (11), said portion being dimensioned such as to come into contact with an inner face (11A) of said seat for said pieces.

30. Means as claimed in claim 27, characterised in that the connection pieces (12) comprise a tooth (17) projecting from the piece (12).

31. Means as claimed in claim 30, characterised in that a hole for housing the free ends of the pins (8) carrying the idle rollers (7) is at least partially provided in the projecting tooth (17).

32. Means as claimed in claim 27, characterised in that the connection pieces of each roller present in a base wall thereof a V-shaped seat (132).

* * * * *